United States Patent
Rhodes et al.

(10) Patent No.: US 9,281,514 B2
(45) Date of Patent: Mar. 8, 2016

(54) BATTERIES PREPARED BY SPINNING

(71) Applicant: Ford Global Technologies, LLC, Dearborn, MI (US)

(72) Inventors: Kevin James Rhodes, Dearborn, MI (US); James A. Adams, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 14/445,263

(22) Filed: Jul. 29, 2014

(65) Prior Publication Data

US 2016/0036037 A1   Feb. 4, 2016

(51) Int. Cl.
*H01M 4/04*   (2006.01)
*H01M 4/58*   (2010.01)
*H01M 4/38*   (2006.01)
*H01M 2/26*   (2006.01)
*H01M 4/70*   (2006.01)
*H01M 10/0525*   (2010.01)

(52) U.S. Cl.
CPC .............. *H01M 4/0483* (2013.01); *H01M 2/26* (2013.01); *H01M 4/386* (2013.01); *H01M 4/58* (2013.01); *H01M 4/70* (2013.01); *H01M 10/0525* (2013.01); *H01M 2220/20* (2013.01)

(58) Field of Classification Search
None
See application file for complete search history.

(56) References Cited

U.S. PATENT DOCUMENTS

| | | |
|---|---|---|
| 7,279,251 B1 | 10/2007 | Yun et al. |
| 2009/0169725 A1 | 7/2009 | Zhamu et al. |
| 2009/0186276 A1 | 7/2009 | Zhamu et al. |
| 2009/0269511 A1 | 10/2009 | Zhamu et al. |
| 2012/0034512 A1 | 2/2012 | Zhang et al. |
| 2012/0082884 A1 | 4/2012 | Orilall et al. |
| 2015/0099185 A1* | 4/2015 | Joo .......................... H01M 4/13 429/231.8 |
| 2015/0162588 A1* | 6/2015 | Lee ..................... H01M 2/1606 429/145 |

FOREIGN PATENT DOCUMENTS

WO    2013/130690 A1    9/2013

OTHER PUBLICATIONS

Xiangwu Zhang, Liwen Ji, Ozan Toprakci, Yinzheng Liang & Mataz Alcoutlabi (2011) Electrospun Nanofiber-Based Anodes, Cathodes, and Separators for Advanced Lithium-Ion Batteries, Polymer Reviews, 51:3, 239-264.*

"Steps to Fabricating a Rechargable Lithium Ion Battery" Jun. 13, 2013, downloaded from URL < http://www.eco-aesc-lb.com/en/process> on Oct. 10, 2015.*

(Continued)

*Primary Examiner* — Joseph Schoenholtz

(74) *Attorney, Agent, or Firm* — Damian Porcari Brooks Kushman P.C.

(57) ABSTRACT

A method of forming a lithium-ion battery by spinning and a battery formed thereby are disclosed. The spinning may include electrospinning A first anode layer may be spun, followed by a first separator layer, a first cathode layer, and a second separator layer. Each layer may be spun directly onto the previously spun layer to provide a battery that does not include metal current collectors. The anode and/or cathode layers may include polyacrylonitrile (PAN) fibers. To render the anode and cathode layers conductive, they may be carbonized using a heat source (e.g., a laser). The disclosed method may allow for the incorporation of high capacity materials, such as sulfur and/or silicon, in the electrode active materials.

20 Claims, 4 Drawing Sheets

(56) References Cited

OTHER PUBLICATIONS

In Situ Formed Lithium Sulfide/Microporous Carbon Cathodes for Lithium-Ion Batteries, Shiyou Zheng, Yvonne Chen, Yunhua Xu, Feng Yi, Yujie Zhu, Yihang Liu, Junhe Yang, and Chunsheng Wang ACS Nano 2013 7 (12), 10995-11003.*

O'Hara, T., Wesselmark, M., "Battery Technologies: A General Overview and Focus on Lithium Ion" Intertek, downloaded from URL<http://automotivedigest.com/wp-content/uploads/2012/08/Intertek-Battery-Technologies-white-paper.pdf> on Oct. 10, 2014.*

Lu, L., et. al. "A Review of the Key Issues for Lithium-ion Battery Management in Electric Vehicles", Journal of Power Sources 226 (2013) pp. 272-288.*

Electrospun Core—Shell Fibers for Robust Silicon Nanoparticle-Based Lithium Ion Battery Anodes Tae Hoon Hwang, Yong Min Lee, Byung-Seon Kong, Jin-Seok Seo, and Jang Wook Choi Nano Letters 2012 12 (2), 802-807.*

Fergus, J., "Recent Developments in Cathode Materials for Lithium ion Batteries", Journal of Power Sources, 195 (2010) pp. 939-954.*

\* cited by examiner

BATTERIES PREPARED BY SPINNING

TECHNICAL FIELD

The present disclosure relates to spun batteries and methods of preparing the same.

BACKGROUND

Enhancement of battery performance is an important issue in the advancement of portable electronics, power grid regulation, and electrified vehicles. Rechargeable or secondary batteries generally include positive and negative electrodes, a separator, and an electrolyte. Current collectors are attached to each electrode in order to extract current from the battery. Rechargeable batteries, such as lithium-ion batteries, have not yet attained the necessary specifications in energy density and rate capability that are needed to make long-range electric vehicles (EVs) a viable option for many consumers. The relatively limited porosity of the electrodes, low specific capacities of cathode materials, and added weight from battery components are significant factors in these short comings.

SUMMARY

In at least one embodiment, a lithium-ion battery is provided. The battery may include a first anode layer including a conductive bulk fiber and an anode active material, a first non-conductive, porous layer contacting the first anode layer, a first cathode layer including a conductive bulk fiber and a cathode active material contacting the first non-conductive, porous layer, and a second non-conductive, porous layer contacting the first cathode layer.

At least a portion of the anode active material may be embedded in the conductive bulk fiber of the anode layer and at least a portion of the cathode active material may be embedded in the conductive bulk fiber of the cathode layer. The anode active material may include silicon nanoparticles and the the cathode active material may include sulfur, such as nanoparticles of elemental sulfur or $Li_2S$. Each of the first anode and cathode layers may include a body and a collector tab extending from the body, the collector tab including a conductive bulk fiber. The conductive bulk fiber of the first anode and cathode layers may be a carbonized polymer. The first and second non-conductive, porous layers may be first and second separator layers.

The battery may further comprise a second anode layer including a conductive bulk fiber and an anode active material contacting the second separator layer, a third separator layer contacting the second anode layer, and a second cathode layer including a conductive bulk fiber and a cathode active material contacting the third separator layer.

In at least one embodiment, a lithium-ion battery is provided comprising a plurality of anode layers, each including a conductive bulk fiber and an anode active material, a plurality of cathode layers, each including a conductive bulk fiber and a cathode active material, and a plurality of non-conductive separator layers, each separating one of the plurality of anode layers from one of the plurality of cathode layers.

The anode active material may include silicon and at least a portion of the anode active material may be embedded in the conductive bulk fiber of each anode layer. The cathode 1 active material may include sulfur and at least a portion of the cathode active material may be embedded in the conductive bulk fiber of each cathode layer. In one embodiment, no metal current collectors are in contact with the plurality of anode layers or the plurality of cathode layers. The plurality of anode layers and the plurality of cathode layers may have a porosity of 40% to 80%. The plurality of separator layers may each have a thickness of 1 to 12 μm.

In at least one embodiment, a method for forming a battery is provided comprising (a) spinning a first anode layer; (b) spinning a first separator layer onto the first anode layer; (c) spinning a first cathode layer onto the first separator layer; and (d) spinning a second separator layer onto the first cathode layer.

The method may further include the steps of carbonizing the first anode layer prior to step (b) and carbonizing the first cathode layer prior to step (d). In one embodiment, the carbonizing steps are performed using a laser. The spinning in steps (a)-(d) may be performed using electrospinning Step (a) may include spinning a polyacrylonitrile (PAN) fiber and an anode active material and step (c) may include spinning a PAN fiber and a cathode active material.

DETAILED DESCRIPTION

Figure 1:
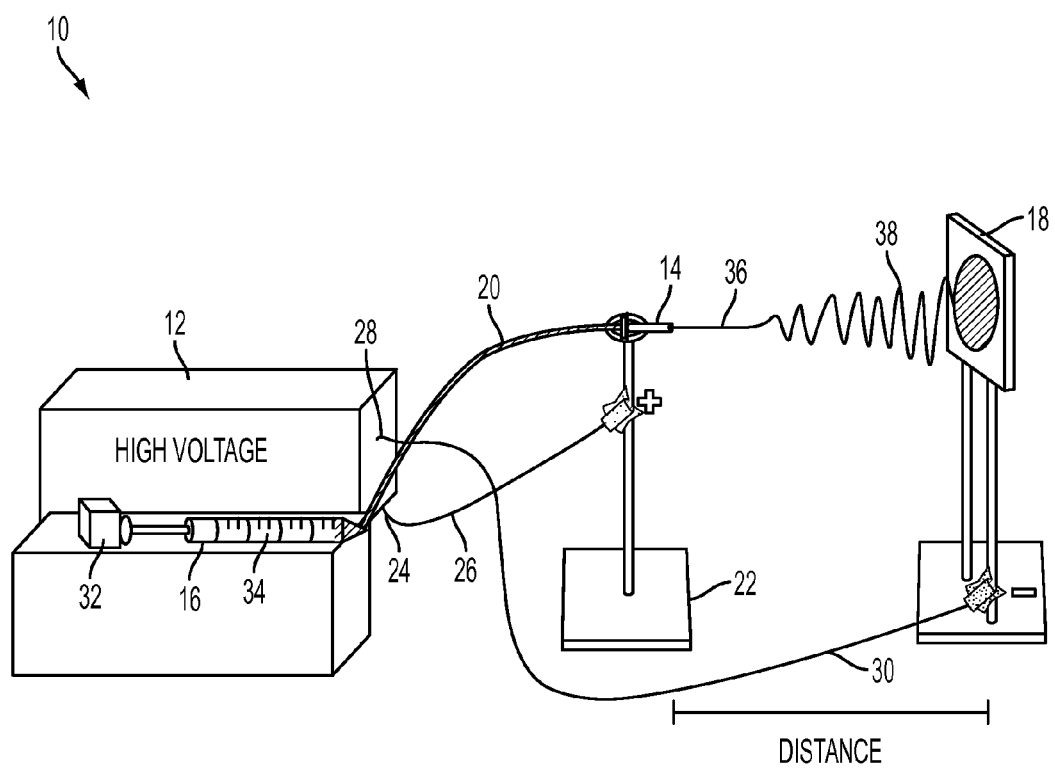
FIG. 1 is a schematic view illustrating the electrospinning process.
Figures 2A, 2B, 2C:
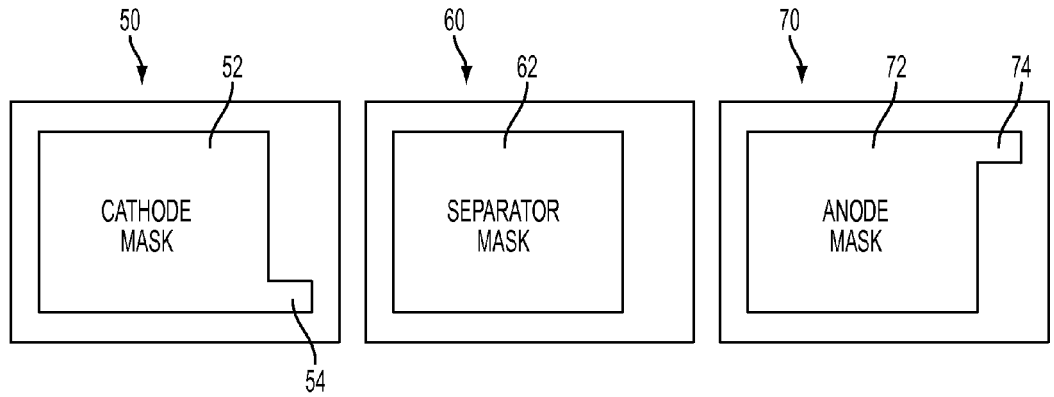
FIGS. 2A-2C are mask patterns for a cathode, separator, and anode, respectively, according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A conventional lithium-ion battery (LIB) generally includes a negative electrode (anode), a positive electrode (cathode), a separator, an electrolyte disposed within the electrodes and separator, and a current collector contacting each of the anode and cathode. The current collector is generally formed of a sheet of copper or aluminum. A common method of forming LIBs is to cast the anode and cathode materials onto their respective current collectors and then stack them with a separator in between the anode and cathode materials. The anode and cathode generally include an active material and a binder. The active material for the anode is often a form of carbon, for example, graphite, while the active material for the cathode is often a lithium metal oxide. The binder may be aqueous or non-aqueous, such as carboxymethyl cellulose (CMC) or polyvinylidene fluoride (PVDF), respectively. Separators are commonly made of a polyolefin, such as polyethylene or polypropylene. The electrolyte generally includes a lithium salt, such as $LiPF_6$, and an organic solvent, such as ethylene carbonate (EC), dimethyl carbonate (DMC), diethyl carbonate (DEC), or mixtures thereof.

A number of high capacity materials, such as silicon (Si) and sulfur (S), may potentially increase the capacities of LIBs if incorporated into the anode and/or cathode. However, these materials may suffer from degradation and dissolution issues that prohibit their use in batteries having the standard architecture. For example, when sulfur is used in conventional LIBs, the sulfur may dissolve into and/or react with the liquid electrolyte and may form polysulfides (e.g., $Li_2S_8$). The dissolution and/or reaction of the sulfur may therefore reduce the activity of the electrode. In addition, once the sulfur is liberated from, e.g., the cathode, it may migrate back and forth between the electrodes. This shuttle effect may reduce the activity of the electrodes and may lead to an ionic short in the battery. Silicon also presents difficulties when used in conventional LIBs. For example, when Si alloys with lithium, its structure swells from a dense crystalline structure to a larger, less dense structure. This large volume change can lead to cracking in the electrodes over time, as the active material swells and shrinks in cycles. The repeated volume changes and cracking can lead to increased solid-electrolyte interphase (SEI) formation, particularly at the anode. In addition, the pulverized structure may cause the active material to lose contact with the metal current collector, reducing its activity.

It has been discovered that spinning (e.g., electrospinning) of electrode materials may provide the ability to encapsulate these high capacity materials (e.g., S and Si) and thereby eliminate or mitigate some of these issues. For example, when the active material in the cathode includes elemental sulfur or lithium sulfide particles (e.g., $Li_2S$) and/or the active material in the anode includes silicon particles, at least some of the particles may become embedded in the electrospun fibers. The embedded particles may therefore have less direct interaction with the electrolyte. As a result, the dissolution and/or formation of polysulfides may be mitigated or eliminated for sulfur-containing active materials. Rather than the sulfur reacting with the lithium and potentially being dissolved into the electrolyte, the sulfur stays within the fiber and the lithium ions may diffuse through the fiber. Embedded silicon particles also are retained within the fibers, which may be conductive (discussed in more detail, below). Accordingly, the embedded particles may stay in contact with the conductive fibers in the swollen state, thereby retaining their activity. In addition, the encapsulation of the silicon particles shifts the interface with the electrolyte to the fibers instead of the silicon, which may reduce SEI formation.

It has also been found that spinning of electrode materials may provide a massively interconnected porous network in the electrodes. However, spinning the electrodes may still require the use of a conventional separator, because the high temperature carbonization step needed to make the electrodes conductive would also do the same to the separator if the carbonization process was performed on a complete stack (e.g., anode-separator-cathode).

Accordingly, with respect to FIGS. 1 to 5, a method of preparing a fully electrospun lithium ion battery (LIB) and a LIB prepared therefrom are disclosed. The general process of electrospinning is known in the art and will not be described in great detail. In brief, electrospinning includes applying a high voltage to a droplet of polymer solution or melt, thereby inducing a strong charging effect on the fluid. At a certain charge level, electrostatic repulsion overcomes the surface tension of the liquid and the droplet is stretched until a stream of liquid is ejected from the droplet. The point of ejection is known as a Taylor cone. Molecular cohesion causes the stream to stay together, such that a charged liquid jet is formed. The liquid jet begins to solidify in the air, at which point the charge in the liquid migrates to the surface of the forming fiber. Small bends in the fiber lead to a whipping process caused by electrostatic repulsion. The whipping process elongates and narrows the fibers, generally resulting in a uniform fiber diameter of 0.05 to 100's of micrometers (μm).

FIG. 1 is a schematic generally describing the electrospinning process and equipment. The electrospinning system 10 generally includes a power supply 12, which may be a high voltage DC power supply (e.g., 5 to 50 kV), a spinneret 14, a syringe 16 and a collector 18. The spinneret 14 may be a hypodermic syringe needle or other narrow, hollow tube structure. The spinneret 14 may be directly attached to the syringe 16 or may be connected by a 1 tube or hose 20. The spinneret 14 may be supported by a stand 22, which may be configured to hold the spinneret 14 at a certain position relative to the collector 18 (e.g., height, horizontal distance, angle). The spinneret 14 or the stand 22 may be electrically connected to a positive terminal 24 of the power supply 12 by a wire 26 and the collector 18 may be electrically connected to a negative terminal 28 of the power supply 12 by a wire 30. Alternatively, the collector 18 may be grounded.

During the electrospinning process, a polymer solution, sol-gel, particulate suspension, or melt may be loaded into the syringe 16, which may then be actuated by a pump 32 to force the polymer liquid 34 into and through the spinneret 14, generally at a constant rate. Alternatively, the polymer liquid 34 may be fed to the spinneret from a tank under constant pressure. The liquid is charged at the spinneret 14 and forms a jet 36, as described above. As the jet 36 solidifies, it whips into a fiber 38 and is collected on the collector 18. A variety of factors or parameters can affect the size and properties of the resulting fibers 38, including the molecular weight and type of the polymer, solution concentration, the liquid properties (e.g., viscosity, conductivity, and surface tension), the electric potential and flow rate, the distance between the spinneret 14 and the collector 18, ambient conditions (e.g., temperature and humidity), the motion and/or size of the collector 18, and the gauge of the needle or tube in the spinneret 14.

With reference to FIGS. 2-5, an electrospun battery and a method of forming an electrospun battery are disclosed. With reference to FIGS. 2A-2C, masks are illustrated for patterning the components of a battery. FIG. 2A shows an embodiment of a cathode mask 50, which may have a body portion 52 for forming the electrode field and a tab portion 54 for forming a collector tab allowing connection to an external circuit. FIG. 2B shows an embodiment of a separator mask 60, which may have a body portion 62. The separator mask 60 does not require a tab portion, since there is no connection to an external circuit from the separator. FIG. 2C shows an embodiment of an anode mask 70, which have a body portion 72 for forming the electrode field and a tab portion 74 for forming a collector tab allowing connection to an external circuit. While the electrode masks are shown having a single collector tab portion, two or more tab portions may be formed by the masks. The masks 50, 60, 70 may be configured to form components having generally rectangular body portions, however, the masks may be configured to form any suitable shape.

Figure 3:
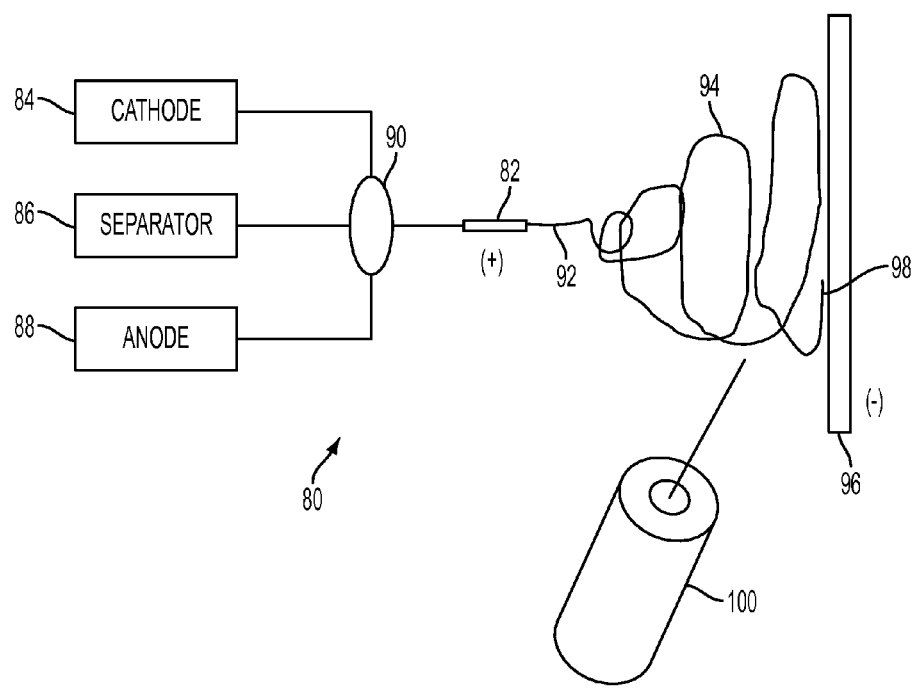
FIG. 3 is a schematic view of an electrospinning process for preparing an electrospun battery, according to an embodiment.

With reference to FIG. 3, a schematic of an electrospinning system 80 is shown, which is a simplified diagram of FIG. 1. As shown, the system 80 may include a spinneret 82 that may receive a liquid material from a source, such as a cathode material 84, separator material 86, or anode material 88. The source materials may be fed to a common syringe or pump 90 that may select which source material to provide to the spinneret 82. The spinneret 82 may then direct a jet 92 of material towards a collector 96, forming a fiber 94 as the liquid solidifies on its way to the collector 96. As a result, an electrospun component 98 is formed on the collector 96. The fiber diameter may vary depending on the electrospinning parameters. For example, the fibers may have a diameter of 50 nm to 50 μm.

A heating source 100 is provided, which may be a laser. The laser may be a pulsed laser, for example a Nd:YAG pulsed laser. The laser may be configured to raster over a surface of the electrospun component 98 in order to heat the surface. In one embodiment, the heat generated by the laser is used to carbonize the electrospun component 98 (e.g., cathode or anode material) in order to make it electrically conductive (or more electrically conductive). Other heating sources may be used instead of, or in addition to, a laser. The heating source may be any device capable of heating localized regions of the electrospun component 98 that is collected on the collector 96. In addition to heating localized areas of the component, the heating source may also be configured to heat a predetermined thickness of the component. For example, if a component 98 has a thickness of 10 μm, the heating source 100 may be configured to only heat a region to a depth of 10 μm, such that any material stacked behind the component 98 is not significantly heated or is heated to a significantly lower temperature.

Again with reference to FIG. 3, the cathode material 84, separator material 86, and the anode material 88 may be any suitable materials to form a rechargeable battery, such as a LIB. In at least one embodiment, the cathode material 84 and/or the anode material 88 may include high capacity materials, such as silicon, sulfur, or high capacity NMC. For example, silicon may have a specific capacity of up to 3,579 mAh/g and sulfur may have a specific capacity of up to 1,166 mAh/g. These materials may provide increased capacity to LIBs, but suffer from degradation and dissolution issues when used in conventional battery architectures, as described above. In at least one embodiment, the cathode material 84 includes a base polymer and a solvent capable of dissolving the base polymer. In one embodiment, the base polymer is polyacrylonitrile (PAN), a PAN co-polymer, or a PAN-derivative. A suitable solvent for PAN may include dimethylformamide (DMF).

In addition to PAN, other base materials that can be heat treated to form stable, carbonized fibers without melting may be used. In some embodiments, the cathode material 84 may include a base polymer mixed with an active material. The active material may include elemental sulfur and/or sulfur-containing compositions, such as lithium sulfide ($Li_2S$). However, other cathode active materials may be used, such as lithium nickel cobalt aluminum oxide (NCA), lithium nickel manganese cobalt oxide (NMC), lithium manganese spinel oxide (Mn spinel or LMO), and lithium iron phosphate (LFP) and its derivatives lithium mixed metal phosphate (LFMP). In addition, mixtures of any of two or more of these materials may be used, for example a mixture of NMC and LMO. The cathode active material may have a specific capacity of up to or greater than 1,166 mAh/g. For example, the active material may have a specific capacity of 500 to 1,166 mAh/g, 700 to 1,166 mAh/g, or 900 to 1,166 mAh/g.

In at least one embodiment, the active material is present in the form of nanoparticles. Upon electrospinning of the cathode material 84, at least some of the nanoparticles may become embedded within the base polymer fibers. For example, a cathode component may be formed of PAN fibers having S or $Li_2S$ nanoparticles embedded therein. If non-lithium containing materials, such as elemental sulfur, are used in the cathode material 84, the anode material 88 (discussed further, below) may be lithiated prior to being electrospun, such that the battery may be fabricated in a charged state.

In at least one embodiment, the separator material 86 includes a base polymer and a solvent capable of dissolving the base polymer. Suitable base polymers for the separator may include polyolefins, such as polyethylene or polypropylene, or other polymers including polyvinylidene fluoride (PVDF). The separator material 86 may also include additives to improve is properties and performance. Examples of additives may include barium titanate ($BaTiO_3$) and/or alumina ($Al_2O_3$) to improve thermal and mechanical properties.

In at least one embodiment, the anode material 88 includes a base polymer and a solvent capable of dissolving the base polymer. In one embodiment, the base polymer is polyacrylonitrile (PAN), a PAN co-polymer, or a PAN-derivative. However, other base materials that can be heat treated to form stable, carbonized fibers without melting may be used. Suitable solvents for PAN are discussed above with reference to the cathode material 84. In some embodiments, the anode material 88 may include a base polymer mixed with an active material. The active material may include, for example, silicon or silicon-containing compounds. However, other anode active materials may be used, such as graphite (natural, artificial, or surface-modified natural), hard carbon, soft carbon, and lithium titanate oxide (LTO). The anode active material may have a specific capacity of up to or greater than 3,579 mAh/g. For example, the active material may have a specific capacity of 1,500 to 3,579 mAh/g, 2,000 to 3,579 mAh/g, 2,500 to 3,579 mAh/g, or 3,000 to 3,579 mAh/g. In at least one embodiment, the active material is present in the form of nanoparticles. Upon electrospinning of the anode material 88, at least some of the nanoparticles may become embedded within the base polymer fibers. For example, an anode component may be formed of PAN fibers having silicon nanoparticles embedded therein.

Figure 4:
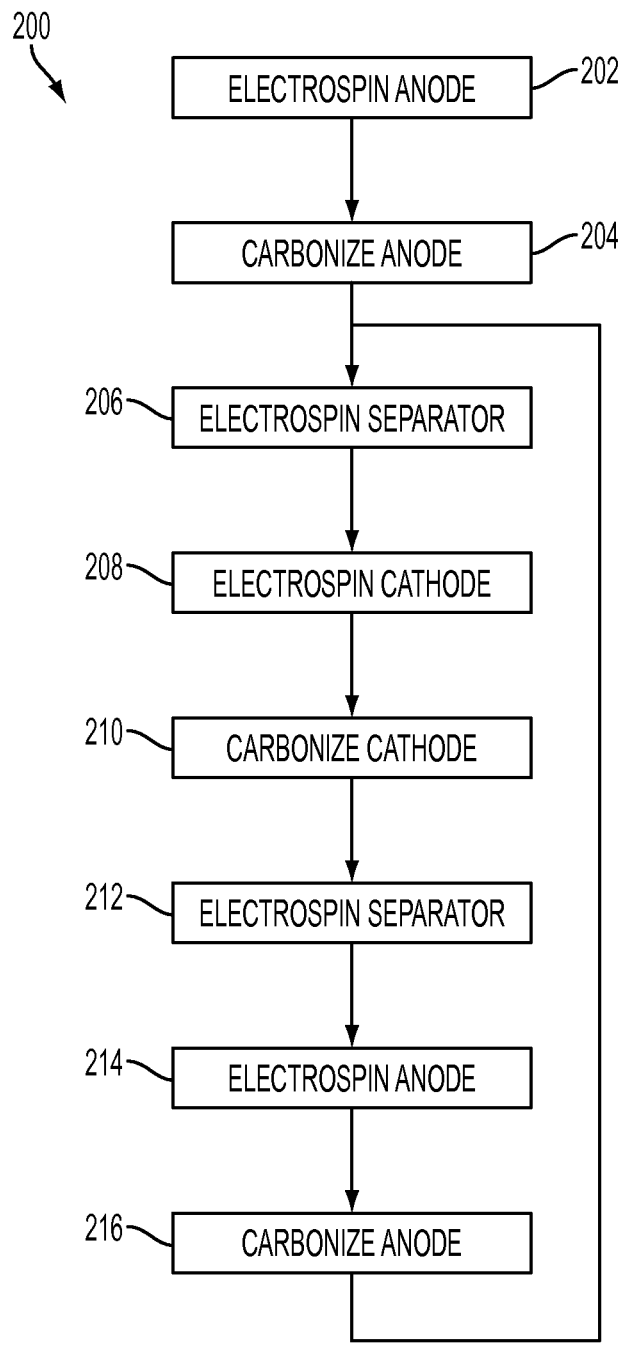
FIG. 4 is a method of forming a rechargeable battery by electrospinning, according to an embodiment.

With reference to FIG. 4, a method 200 of forming an electrospun battery is provided, according to an embodiment. The masks described in FIG. 2 and the system described in FIG. 3 may be used to carry out the method 200. In step 202, an anode material is electrospun onto a conductive collector to form a first anode layer. A mask may be used to pattern the anode material into a body portion and a collector tab, such as described with reference to FIG. 2C. While a single collector tab is shown, multiple collector tabs may be formed. In addition to masks, other methods may also be used to form the anode shape. One example may include moving the electrospinning spinneret/nozzle in a predetermined pattern, similar to CNC milling or 3-D printing. Another example may include the use of an external electric field to direct the patterning of the fiber, similar to the directing of an electron beam in TVs having cathode ray tubes. Furthermore, it may be possible to electrospin a larger than needed area and then cut or trim the layer into the desired anode shape.

In step 204, the polymer in the anode layer is carbonized (e.g., converted into substantially all carbon) using a heat source. The heat source may be a laser or a pulsed laser, and it may be rastered over the anode layer surface to heat and carbonize the anode layer. The carbonizing step 204 may be a single step or may be split into two or more steps. The structure of PAN fibers may be stabilized by a heat treatment of about 250-300° C., for example, 280° C. PAN fibers are carbonized by a heat treatment of about 700-1200° C., for example, 900° C. The carbonization process may convert the polymer fibers substantially into carbon. Some residual elements may remain after the carbonization process, such as nitrogen, however, the fibers are generally converted into amorphous carbon having a similar structure to the original base polymer fibers. As a result of the other elements being removed, such as hydrogen, the fibers may shrink slightly. PAN fibers may further be graphitized by a heat treatment of at least about 1400° C., converting the carbon fibers into graphitic carbon.

Accordingly, a single-step carbonization process may be performed by heating (e.g., by laser) the fibers directly to a carbonization or graphitization temperature (e.g., about 900° C. or 1400° C. for PAN fibers). Alternatively, a two-step carbonization process may be performed by first heating the fibers to a stabilizing temperature (e.g., 280° C. for PAN fibers) and then separately heating the fibers to a carbonization or graphitization temperature. While the one-step process may be faster and more efficient, the two-step process may result in a more stable structure for the fibers. The one-step process and at least the second step of the two-step process may be performed in an inert environment (e.g., argon or nitrogen) in order to prevent oxidation/combustion. The stabilizing treatment of the two-step process may also be done in an inert environment, however, it may also be done in air. Instead of an inert environment, it may also be suitable to use a heavy gas that displaces the ambient air to avoid oxidation.

In step 206, a separator material is electrospun onto the first anode layer to form a first separator layer. In at least one embodiment, the separator material is electrospun directly onto the first anode layer, with no intervening material. A mask may be used to pattern the separator material into a body portion, such as described with reference to FIG. 2B. As described above, however, other methods may be used to shape the separator layer. Unlike the anode layer, the separator is not treated with a heat source to carbonize it; therefore, it retains its electronic insulating properties.

In step 208, a cathode material is electrospun onto the first separator layer to form a first cathode layer. In at least one embodiment, the cathode material is electrospun directly onto the first separator layer, with no intervening material. A mask may be used to pattern the cathode material into a body portion and a collector tab, such as described with reference to FIG. 2A. While a single collector tab is shown, multiple collector tabs may be formed. As described above, other methods may also be used to shape the cathode layer. In step 210, the polymer in the cathode layer is carbonized as described above with respect to the anode layer. In order to avoid carbonizing the separator layer underlying the cathode layer, the laser or other heat source may be configured to only heat the cathode layer and not the underlying separator layer. In embodiments where a laser is used as the heat source, the depth profile of the laser may be defined by controlling numerous parameters, such as the total energy of the laser, the wattage, the wavelength, the spot size, the raster speed, the pulse length, etc. It may be acceptable for some heat to reach the underlying layer, as long as it remains substantially uncarbonized and retains sufficient porosity to allow lithium ion movement in the electrolyte.

Following step 210, a separator material (e.g., the separator material of step 206) is electrospun onto the first cathode layer to form a second separator layer in step 212. In at least one embodiment, the separator material is electrospun directly onto the first cathode layer, with no intervening material (e.g., no current collector). The electrospinning of step 212 may be substantially similar to the electrospinning of step 206, other than the underlying material (e.g., first cathode layer instead of first anode layer). However, if a different thickness, different separator material, or other different property is desired for the second separator layer, then the electrospinning parameters may be adjusted for step 212. Similar to step 206, no carbonization treatment is applied to the second separator layer.

In step 214, an anode material (e.g., the anode material of step 202) is electrospun onto the second separator layer to form a second anode layer. In at least one embodiment, the anode material is electrospun directly onto the second separator layer. The electrospinning of step 214 may be substantially similar to the electrospinning of step 202, other than the underlying material (e.g., second separator layer instead of the collector). However, if a different thickness, different anode material, or other different property is desired for the second anode layer, then the electrospinning parameters may be adjusted for step 214 (the same applies for any additional cathode layers). Similar to step 204, the polymer in the second anode layer may be carbonized using a heat source in step 216. The electrospinning of the anode, separator, and cathode layers in the steps above may be adjusted by altering electrospinning parameters such as potential, distance, needle size, temperature, solution concentration, polymer type, polymer molecular weight, target type (e.g., flat plate, rotating cylinder, etc.), or others.

The stacking of separator, cathode, and anode layers may be continued after step 216 for a plurality of cycles to form multiple stacks of layers. Each layer may be spun directly onto the preceding layer, without other intervening layers (e.g., current collectors). Each anode and cathode layer may be carbonized by a heat source, such as a laser, while the separator layers may be left uncarbonized so that they retain their electronic insulating properties. While FIG. 4 and method 200 disclose that the first step is electrospinning of the first anode layer, the method may alternatively start with a first separator layer or a first cathode layer and then continue stacking the other layers in the described (or similar) order. The repeating stacked structure may be described using a repeating unit, such as a group including an anode layer, a cathode layer and two separator layers, with a separator layer separating each anode and cathode layer. For example, the group may be described as an anode-separator-cathode-separator (A-S-C-S) group or a C-S-A-S group, or a S-A-S-C group, etc. Any suitable number of stacked groups may be produced using method 200. In at least one embodiment, an electrospun battery may be produced including 1 to 50 groups, or any sub-range therein. For example, there may be 1 to 30, 2 to 20, 5 to 20, or 10 to 20 groups. For batteries having only a single anode and cathode, the second separator may be eliminated.

Accordingly, following step 210 of method 200, one complete stack of anode-separator-cathode is formed. In conventional battery architecture, a metal current collector would be required to be placed on each side of the stack in order to collect the electrical current generated in the battery. These current collectors add weight and thickness to the battery and limit the direction of lithium ion diffusion to one direction. The disclosed method 200 allows for the elimination of separate current collectors, thereby reducing the weight and thickness of the battery and allowing the lithium ions to diffuse in any direction across any electrode.

Once the desired number of anode, separator, and cathode layers have been electrospun into a stack, the stack may be packaged to form a completed battery. The battery may be in the form of, for example, a coin cell, pouch, or prismatic type cell. The battery may be filled with a liquid electrolyte, which fills the small pores in each layer resulting from the electrospinning process. The liquid electrolyte activates the cell, allowing lithium ion transfer between the electrodes when an external circuit is connected to the collector tabs, such as those created using the masks of FIG. 2. The electrolyte may be any suitable electrolyte, and may include a lithium salt (e.g., $LiPF_6$, $LiBF_4$ or $LiClO_4$) and an organic solvent (e.g., ethylene carbonate (EC), dimethyl carbonate (DMC), diethyl carbonate (DEC), or mixtures thereof).

While the method 200 of FIG. 4 is described above as using electrospinning to form the anode, cathode, and separator layers in steps 202, 206, 208, 212, and 214, other spinning methods may be used to form these battery components. For example, the components could be formed using wet spinning, dry spinning, melt spinning, extrusion spinning, direct spinning, gel spinning, or drawing. In addition, non-spinning methods may be used to form the components, as long as the anode and cathode layers can be carbonized to form a conductive layer. Furthermore, while the method 200 is described as being a generally continuous process, wherein each layer is directly spun onto the preceding layer, it may be possible to form the layers separately and later combine or assemble them into a stack. For example, batches of anode, cathode, and separator layers could be separately prepared using spinning (e.g., electrospinning) or other techniques. The anode and cathode layers could then be carbonized and the layers could be assembled to form a stack. However, the continuous process described with respect to FIG. 4 may provide a battery having better cohesion between the layers, since during the preparation they form a substantially unified or continuous stack, rather than adjacent individual components.

In addition to forming an electrospun battery on a standard collector, such as a flat conductive panel as shown in FIGS. 1 and 3, the method 200 may be used to form batteries on other surfaces, such as vehicle components, in order to utilize empty or unused spaces (e.g., in a vehicle) for extra battery capacity. For example, the collector may be any metal component within a vehicle, such as the interior side of a body panel, trunk surface, or other areas. Non-conductive vehicle components may be coated with a conductive material, have a conductive material attached thereto, or otherwise made conductive. The vehicle component may then be grounded and used as the collector (e.g., collectors 18 and 96 in FIGS. 1 and 3). Masks, such as those described with respect to FIG. 2, may be created to conform to the size and shape of the component that is to be used as the collector. Once the desired number of layers of anode, separator, and cathode has been spun onto the component, a film or some other form of protective barrier could be applied to enclose the battery and form a completed cell. Accordingly, the disclosed methods may be used to form a custom battery on a vehicle component in order to increase the battery capacity of a hybrid, plug-in hybrid, or electric vehicle. In addition to vehicle components, the disclosed electrospinning process may be used on any surface to form a battery thereon.

Figure 5:
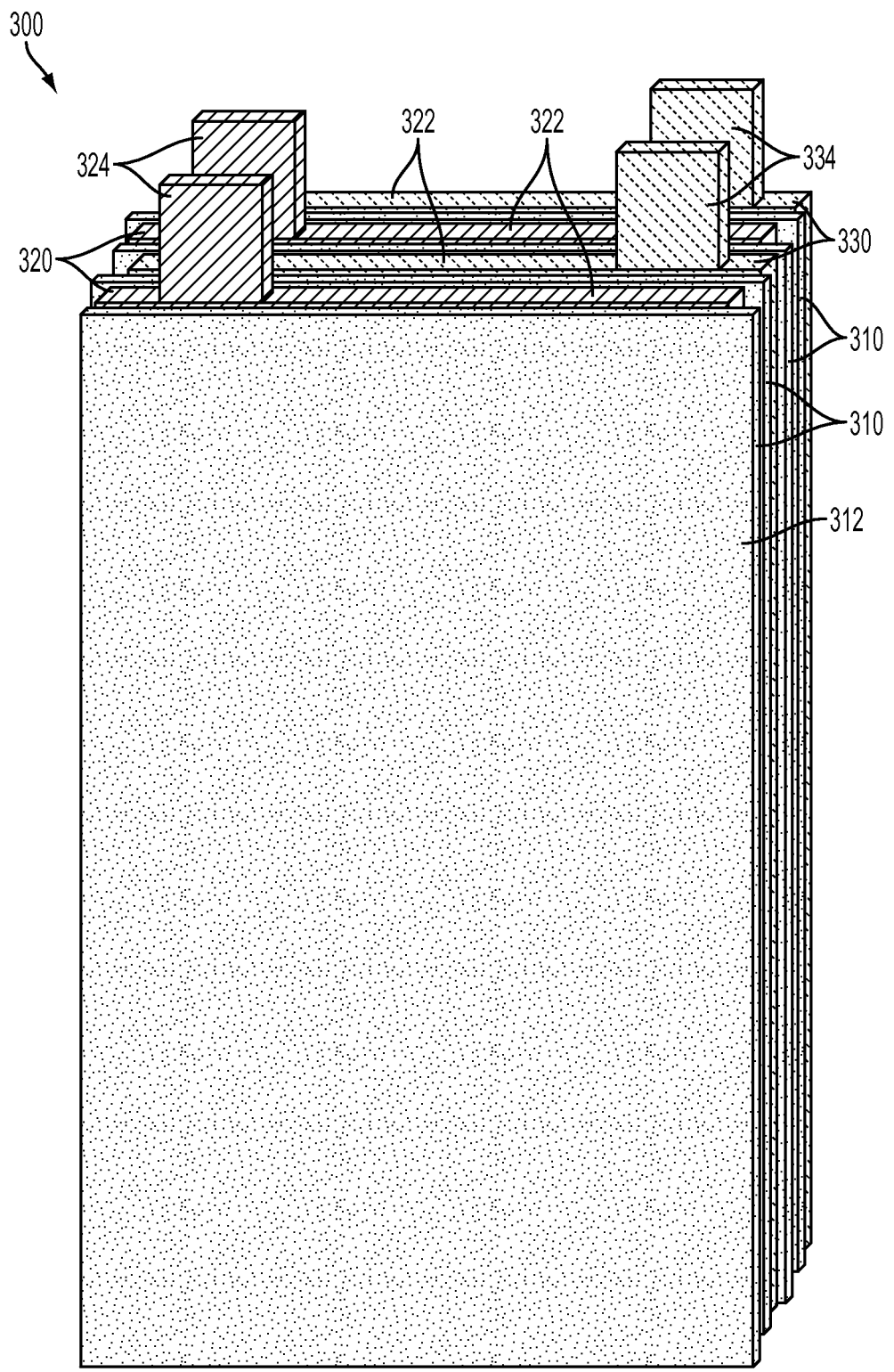
FIG. 5 is a schematic view of an electrospun battery, according to an embodiment.

With reference to FIG. 5, an electrospun battery 300 prepared according to method 200 is shown. The battery 300, as shown, includes four separator layers 310, two cathode layers 320, and two anode layers 330. A separator layer 310 contacts and separates each cathode layer 320 and anode layer 330. The separator layers are non-conductive and may be porous. No separate metal current collectors are present in the battery 300 between groups of anode-separator-cathode layers. Instead, each cathode layer 320 and anode layer 330 may be carbonized such that it includes an electrically conductive bulk fiber. Each cathode layer 320 may include a body 322 and a collector tab 324 and each anode layer 330 may include a body 332 and a collector tab 334. The bodies 322 and 332 may form the electrode field and the collector tabs 324 and 334 may extend from the body portion and allow for connection to an external circuit. The collector tabs 324 and 334 may be formed at the same time and using the same process as the bodies 322 and 332. Accordingly, the tabs 324 and 334 may also be formed of electrically conductive bulk fiber and may include the active materials. In at least one embodiment, the collector tabs 324 may extend from the bodies 322 of the cathode layers in a different location than the collector tabs 334 extend from the bodies 332 of the anode layers 330. For example, if the bodies 322 and 332 are generally rectangular, the collector tabs 324 and 334 may be positioned on opposite ends of one side of the bodies, as shown in FIG. 5. While each cathode layer 320 and anode layer 330 is shown with a single collector tab, each layer may include multiple collector tabs.

The separator layers 310 may include a body 312 that is sized and configured to contact and separate the bodies 322 and 332 of the cathode and anode layers, respectively. The separator layers 310 may have the same or larger dimensions as the cathode and anode layers. For example, if the separator, cathode, and anode layer bodies are all generally rectangular, the separator layer bodies 312 may have the same height and width as the cathode layer or anode layer bodies 322, 332 or one or both of the height and width of the separator layer bodies 312 may be larger than the height or width of the cathode and anode bodies 322, 332. The dimensions of the separator layer bodies 312 may therefore ensure that there is no contact (e.g., electrical contact) between the bodies of the cathode and anode layers. However, the collector tabs 324 and 334 of the cathode and anode layers may extend beyond the separator layer bodies 312, allowing for connection to an external circuit.

The anode layers 330 and cathode layers 320 may have similar dimensions as standard architecture LIBs. The anode layers 330 may each have a thickness of 10 to 100 µm, or any sub-range therein, such as 10 to 75 µm, 20 to 75 µm, or 30 to 50 µm. The cathode layers 320 may each have a thickness of 10 to 100 µm, or any sub-range therein, such as 10 to 75 µm, 20 to 50 µm, or 20 to 40 µm. In one embodiment, the cathode layers 320 may be thinner than the anode layers 330. The anode and cathode layers may have thicknesses beyond the disclosed ranges, depending on the design requirements. Generally, as the electrode thickness decreases, the battery power increased and as the electrode thickness increases, the battery capacity increases.

The separator layers 310 may also have similar dimensions as standard architecture LIBs, e.g., about 16 to 20 µm. However, the electrospinning process may allow for the separator layers to be thinner than conventional separators. Standard architecture LIBs are constructed by assembling the individual electrodes and separator(s) into a stack, which requires that each component have mechanical properties robust enough to be handled. As a result, separator layers in conventional LIBs must be at least about 16 µm or so thick in order to avoid tearing or other damage during handling. Since the battery 300 may be assembled by electrospinning successive layers onto one another, no handling of individual separator layers is required. In addition, conventional separator layers are generally stretched in-plane (i.e., perpendicular to their thickness) during their preparation. This stretching can cause their mechanical properties to be anisotropic, with their strength in the thickness direction being reduced. The electrospinning process generally results in isotropic separator layers, resulting in increased strength in the thickness direction for a given thickness, compared to anisotropic separators. Accordingly, in electrospun battery 300, the separator layer thickness can be reduced to a size based primarily on its required insulating properties, rather than mechanical properties. In one embodiment, the separator layers 310 may each have a thickness of 1 to 20 µm, or any sub-range therein. For example, the separator layers may each have a thickness of 1 to 16 μm, 1 to 15 μm, 1 to 12 μm, 1 to 10 μm, 1 to 8 μm, or 1 to 5 μm.

The electrodes of the electrospun battery 300 may have a higher porosity than in conventional LIBs, due to the highly porous structure created by the electrospinning process. Conventional electrodes may have a porosity of about 30 to 40%. The electrodes of the battery 300 may have a porosity of at least 40%, for example, 40 to 80% or any sub-range therein, such as 45 to 75%, 50 to 75%, 50 to 70%, or 60 to 70%. The increased porosity of the electrodes may increase cell power due to enhanced lithium ion diffusion within the electrolyte and improved utilization of the active material in the electrodes.

The battery 300 may be packed in any suitable manner to form a completed battery cell. For example, the battery 300 may be packaged as a coin, pouch, or prismatic type cell. The battery 300 may be filled with an electrolyte, which may include a lithium salt (e.g., $LiPF_6$) and an organic solvent (e.g., ethylene carbonate (EC), dimethyl carbonate (DMC), diethyl carbonate (DEC), or mixtures thereof).

The electrospun battery 300 may provide substantial weight and costs savings compared to conventional LIBs having metallic current collectors. For example, the electrospun battery 300 may lower the battery cell cost by as much as 10% or more and may reduce the weight of the cell by as much as 15% or more. In addition to cost and weight savings, the specific energy and energy density of the electrospun battery 300 may be improved compared to conventional LIBs. Furthermore, the open porous structure of the electrospun electrodes 320 and 330 and the interconnected electrically conductive fibers may improve the cell power of the electrospun battery 300. The incorporation of the active material (e.g., nanoparticles of S, $Li_2S$ or Si) in the fibers may also improve the utilization of the active material, thereby further improving cell performance and/or lowering active material costs. The electrical resistance of the conductive fibers in the electrodes may be higher than the resistance of conventional metallic current collectors (e.g., copper or aluminum), however, the above benefits compensate for the reduced conductivity. In addition, the increased resistance may not be a significant factor for battery designs with short conductive paths.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. Furthermore, while the methods of forming a battery and the batteries formed therefrom have been described with respect to lithium-ion batteries, the methods and the battery architecture disclosed may also be used for other energy storage devices. For example, the methods and architecture may be applicable to other rechargeable battery types and super capacitors.

What is claimed is:

1. A lithium-ion battery comprising:
   a first anode layer including a conductive bulk fiber and an anode active material;
   a first non-conductive, porous layer contacting the first anode layer;
   a first cathode layer including a conductive bulk fiber and a cathode active material contacting the first non-conductive, porous layer; and
   a second non-conductive, porous layer contacting the first cathode layer;
   wherein each of the first anode and cathode layers includes a body and a collector tab extending from the body, the collector tab including a conductive bulk fiber.

2. The battery of claim 1, wherein at least a portion of the anode active material is embedded in the conductive bulk fiber of the anode layer and at least a portion of the cathode active material is embedded in the conductive bulk fiber of the cathode layer.

3. The battery of claim 1, wherein the first anode layer and the first cathode layer have a porosity of 40% to 80% and the first and second non-conductive, porous layers each have a thickness of 1 to 12 μm.

4. The battery of claim 1, wherein the conductive bulk fiber of the first anode and cathode layers is a carbonized polymer.

5. The battery of claim 1, wherein the first and second non-conductive, porous layers are first and second separator layers.

6. The battery of claim 2, wherein the anode active material includes silicon nanoparticles.

7. The battery of claim 2, wherein the cathode active material includes sulfur.

8. The battery of claim 7, wherein the cathode active material includes nanoparticles of elemental sulfur or $Li_2S$.

9. The battery of claim 1 further comprising:
   a second anode layer including a conductive bulk fiber and an anode active material contacting the second non-conductive, porous layer;
   a third non-conductive, porous layer contacting the second anode layer; and
   a second cathode layer including a conductive bulk fiber and a cathode active material contacting the third non-conductive, porous layer.

10. A lithium-ion battery comprising:
    a plurality of anode layers, each including a conductive bulk fiber and an anode active material;
    a plurality of cathode layers, each including a conductive bulk fiber and a cathode active material; and
    a plurality of non-conductive separator layers, each separating one of the plurality of anode layers from one of the plurality of cathode layers;
    wherein no metal current collectors are in contact with the plurality of anode layers or the plurality of cathode layers.

11. The battery of claim 10, wherein the anode active material includes silicon and at least a portion of the anode active material is embedded in the conductive bulk fiber of each anode layer.

12. The battery of claim 10, wherein the cathode active material includes sulfur and at least a portion of the cathode active material is embedded in the conductive bulk fiber of each cathode layer.

13. The battery of claim 10, wherein each of the plurality of anode and cathode layers includes a body and a collector tab extending from the body, the collector tab including a conductive bulk fiber.

14. The battery of claim 10, wherein the plurality of anode layers and the plurality of cathode layers have a porosity of 40% to 80%.

15. The battery of claim 10, wherein the plurality of non-conductive separator layers each have a thickness of 1 to 12 μm.

16. A method for forming a battery comprising:
    (a) spinning a first anode layer and carbonizing the first anode layer using a laser;

(b) spinning a first separator layer onto the carbonized first anode layer;

(c) spinning a first cathode layer onto the first separator layer and carbonizing the first cathode layer using a laser; and (d) spinning a second separator layer onto the carbonized first cathode layer.

17. The method of claim 16, wherein the spinning in steps (a)-(d) is performed using electrospinning.

18. The method of claim 16, wherein step (a) includes spinning a polyacrylonitrile (PAN) fiber and an anode active material and step (c) includes spinning a PAN fiber and a cathode active material.

19. The method of claim 18, wherein the anode active material includes silicon nanoparticles and the cathode active material includes nanoparticles of elemental sulfur or $Li_2S$.

20. The method of claim 16, wherein step (a) includes spinning a first anode layer having a porosity of 40% to 80%, step (b) includes spinning a first separator layer having a thickness of 1 to 12 µm, step (c) includes spinning a first cathode layer having a porosity of 40% to 80%, and step (d) includes spinning a second separator layer having a thickness of 1 to 12 µm.

* * * * *